US012730465B2

(12) United States Patent
Yoo

(10) Patent No.: US 12,730,465 B2
(45) Date of Patent: Sep. 8, 2026

(54) REGULATOR WITH DYNAMIC VOLTAGE SCALING (DVS) CONTROLLED POWER-OFF SEQUENCING AND POWER MANAGEMENT INTEGRATED CIRCUIT INCLUDING THE SAME

(71) Applicant: Samsung Electronics Co., Ltd., Suwon-si (KR)

(72) Inventor: Gi-Young Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 254 days.

(21) Appl. No.: 18/602,173

(22) Filed: Mar. 12, 2024

(65) Prior Publication Data

US 2024/0402741 A1 Dec. 5, 2024

(30) Foreign Application Priority Data

Jun. 5, 2023 (KR) ........................ 10-2023-0072398

(51) Int. Cl.
*G05F 1/56* (2006.01)
*G05F 1/565* (2006.01)
*G05F 1/575* (2006.01)

(52) U.S. Cl.
CPC .............. *G05F 1/565* (2013.01); *G05F 1/575* (2013.01)

(58) Field of Classification Search
CPC ........... G05F 1/565; G05F 1/575; G05F 1/618
See application file for complete search history.

(56) References Cited

U.S. PATENT DOCUMENTS 6,437,638 B1 * 8/2002 Coles ...................... G05F 1/618 327/540
8,080,983 B2 12/2011 Lourens et al.
9,372,491 B2 6/2016 Bhattad et al.
10,642,296 B2 5/2020 Gebeyehu et al.
10,693,305 B2 6/2020 Baier et al.
11,474,546 B2 10/2022 Tyagi et al.
2021/0080985 A1 * 3/2021 Shreepathi Bhat ..... G05F 1/575
2022/0300021 A1 9/2022 Gwon et al.
2023/0205246 A1 * 6/2023 Roh .......................... G05F 1/56
2024/0319755 A1 * 9/2024 Jiang ....................... G05F 1/575

FOREIGN PATENT DOCUMENTS

KR 10-0601582 B1 7/2006
KR 10-1982919 B1 5/2019

* cited by examiner

*Primary Examiner* — Lakaisha Jackson
(74) *Attorney, Agent, or Firm* — Harness, Dickey & Pierce, P.L.C.

(57) ABSTRACT

A regulator includes a reference voltage generation circuit generating a second reference voltage varied from a first reference voltage according to a dynamic control signal, an error amplifier configured to generate an error voltage based on the second reference voltage and a regulation voltage at an output node, a power transistor including a gate terminal connected to the error amplifier and receiving an input voltage to output the regulation voltage to the output node based on the error voltage, a dynamic voltage scaling (DVS) circuit connected to the reference voltage generation circuit and the output node and dropping the regulation voltage to the second reference voltage, and a control circuit receiving a power-off signal from a processor and turning off the power transistor when the regulation voltage drops to the second reference voltage by the DVS circuit.

20 Claims, 8 Drawing Sheets

REGULATOR WITH DYNAMIC VOLTAGE SCALING (DVS) CONTROLLED POWER-OFF SEQUENCING AND POWER MANAGEMENT INTEGRATED CIRCUIT INCLUDING THE SAME

CROSS-REFERENCE TO RELATED APPLICATIONS

This application claims priority under 35 U.S.C. § 119 to Korean Patent Application No. 10-2023-0072398 filed on Jun. 5, 2023, in the Korean Intellectual Property Office, the disclosures of which are incorporated by reference herein in their entireties.

BACKGROUND

Various example embodiments of the present inventive concepts described herein relate to a regulator and a power management integrated circuit including the regulator.

A power management integrated circuit (PMIC) manages various levels of power or provides the power to a system, device, or elements included in the device. As an example, the PMIC turns off all supplied power or turns on or off some power according to an operation mode of power supply target. In this case, a discharge time is different for each power rail to which the power is supplied.

SUMMARY

Various example embodiments of the present inventive concepts provide a regulator capable of preventing or reducing a voltage reversal phenomenon even though a discharge time is different for each power rail and a power management integrated circuit including the regulator.

According to an embodiment, a regulator includes a reference voltage generation circuit configured to generate a second reference voltage varied from a first reference voltage according to a dynamic control signal, an error amplifier configured to generate an error voltage based on the second reference voltage and a regulation voltage at an output node, a power transistor including a gate terminal connected to the error amplifier and configured to receive an input voltage to output the regulation voltage to the output node based on the error voltage, a dynamic voltage scaling (DVS) circuit connected to the reference voltage generation circuit and the output node and configured to drop the regulation voltage to the second reference voltage, and a control circuit configured to receive a power-off signal from a processor and further configured to turn off the power transistor when the regulation voltage drops to the second reference voltage by the DVS circuit.

According to an embodiment, a power management integrated circuit includes one or more regulators configured to regulate an input voltage and output a regulation voltage and a control circuit configured to control the one or more regulators. The control circuit is configured to operate a dynamic voltage scaling (DVS) loop that drops the regulation voltage to a reference voltage varying according to a dynamic control signal when a power-off signal is provided from a processor and turns off one or more power transistors included in the one or more regulators when the regulation voltage drops to the reference voltage.

According to an embodiment, a method of operating a power management integrated circuit includes receiving a power-off signal from a processor, dropping a regulation voltage to a reference voltage using a dynamic voltage scaling (DVS) loop included in the power management integrated circuit, and turning off a power transistor included in the power management integrated circuit based on the regulation voltage dropped to the reference voltage.

According to above, the power management integrated circuit includes the regulator that prevents or reduces a voltage reversal phenomenon even though a discharge time is different for each power rail.

BRIEF DESCRIPTION OF THE FIGURES

The above and other objects and features of the present inventive concepts will become apparent by describing in detail various example embodiments thereof with reference to the accompanying drawings.

DETAILED DESCRIPTION

Below, various example embodiments of the present inventive concepts will be described in detail and clearly to such an extent that an ordinary one in the art may implement the present inventive concepts.

When the terms "about" or "substantially" are used in this specification in connection with a numerical value, it is intended that the associated numerical value includes a manufacturing or operational tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

Figure 1:
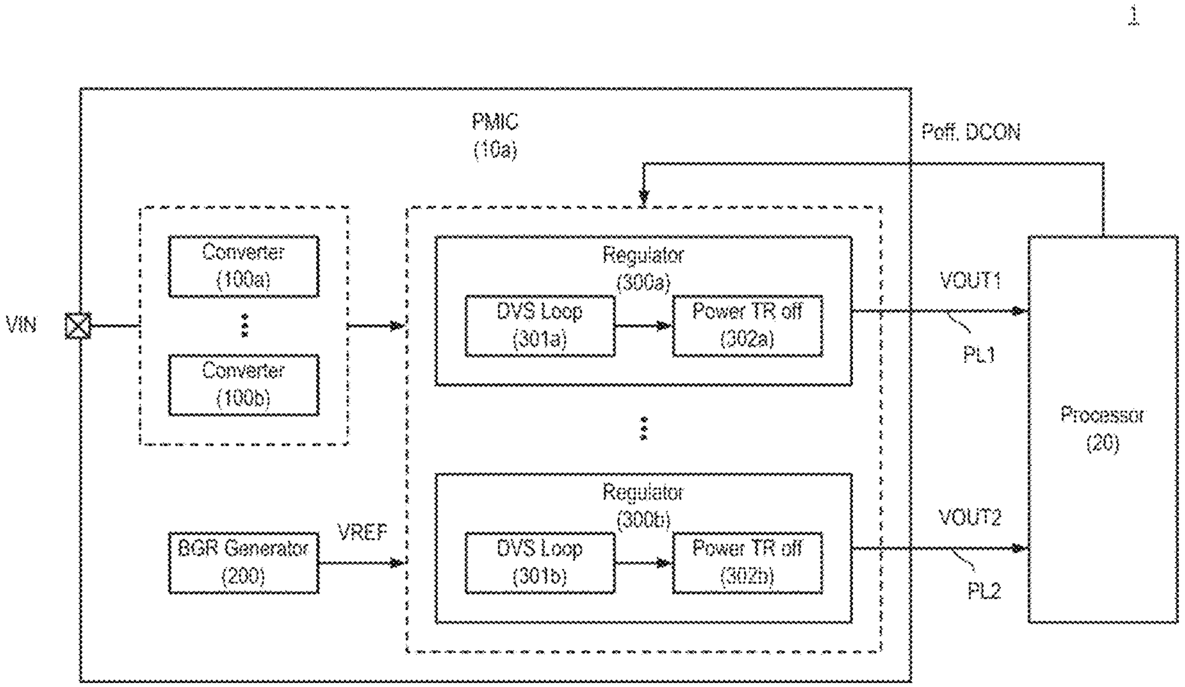
FIG. 1 is a block diagram illustrating a system-on-chip according to an example embodiment.

FIG. 1 is a block diagram illustrating a system-on-chip (SoC) 1 according to an example embodiment.

Referring to FIG. 1, the system-on-chip 1 may include a power management integrated circuit (PMIC) 10*a* and a processor 20.

The PMIC 10*a* may be configured to manage a power consumption of the processor 20. The PMIC 10*a* may be connected to the processor 20 via one or more power rails PL1 and PL2. The PMIC 10*a* may provide various functions, such as voltage and current regulations, battery charging, and power sequencing, for the processor 20. As an example, the PMIC 10*a* may receive an input voltage VIN, may convert the received input voltage VIN into output voltages VOUT1 and VOUT2 of various levels required or used by the processor 20, and may provide the output voltages VOUT1 and VOUT2 to the processor 20.

According to an example embodiment, the PMIC 10*a* may include one or more converters 100*a* and 100*b*, a band gap reference (BGR) generator 200, and one or more regulators 300*a* and 300*b*.

The one or more converters 100*a* and 100*b* may convert the input voltage VIN into voltages required or used by the PMIC 10*a* and may output the converted voltages. As an example, each of the converters 100*a* and 100*b* may output voltages required or used by the one or more regulators 300*a* and 300*b* based on the input voltage VIN or may directly output a voltage required or used by the processor 20. As an example, the one or more converters 100*a* and 100*b* may be a boost converter, a buck converter, or a buck-boost converter.

The BGR generator 200 may generate a reference voltage VREF for a voltage regulation of the one or more regulators 300*a* and 300*b* and may provide the reference voltage VREF to the one or more regulators 300*a* and 300*b*. The reference voltage VREF may be a BGR voltage and may be stable and independent with respect to ambient environment such as temperature.

The one or more regulators 300*a* and 300*b* may be connected to an output terminal of the one or more converters 100*a* and 100*b*. The one or more regulators 300*a* and 300*b* may convert the voltages output from the one or more converters 100*a* and 100*b* based on the reference voltage VREF and may provide the output voltages VOUT1 and VOUT2 of various levels to the processor 20. As an example, the one or more regulators 300*a* and 300*b* may be a low drop-out (LDO) regulator.

The one or more regulators 300*a* and 300*b* may receive a power-off signal Poff and a dynamic control signal DCON from the processor 20. The power-off signal Poff may be provided from the processor 20 when the processor 20 operates in a power-off sequence. The dynamic control signal DCON may be provided from the processor 20 when the processor 20 dynamically controls the voltage using the PMIC 10*a*. The reference voltage VREF for the regulation may be controlled based on the dynamic control signal DCON.

According to an example embodiment, the one or more regulators 300*a* and 300*b* may sequentially perform a driving operation of DVS loops 301*a* and 301*b* and an off-operation of power transistors 302*a* and 302*b* in response to the power-off signal Poff applied thereto.

The one or more regulators 300*a* and 300*b* may control the output voltages VOUT1 and VOUT2 through the DVS loops 301*a* and 301*b* in response to the power-off signal Poff applied thereto. The DVS loops 301*a* and 301*b* may be defined as a circuit loop to drop the output voltages VOUT1 and VOUT2 from the one or more regulators 300*a* and 300*b* to the reference voltage VREF adjusted according to the dynamic control signal DCON. According to an example embodiment, the reference voltage VREF may be set or changed to a certain threshold voltage when the power-off signal Poff is received. Accordingly, in some example embodiments, the one or more regulators 300*a* and 300*b* may drive the DVS loops 301*a* and 301*b* to the threshold voltage after the power-off signal Poff is received. The threshold voltage may be set by taking into account the power-off sequence.

In this case, according to some example embodiments, the driving operation of the DVS loops 301*a* and 301*b* may be performed according to a certain slew rate. As an example, the slew rate may be set so that a voltage drop caused by the DVS loops 301*a* and 301*b* may be performed faster than a discharge due to the turn-off of the power transistors 302*a* and 302*b*.

In some example embodiments, when a level of the output voltages VOUT1 and VOUT2 drops to the threshold voltage by the DVS loops 301*a* and 301*b*, the one or more regulators 300*a* and 300*b* may perform the off-operation of the power transistors 302*a* and 302*b*. The one or more regulators 300*a* and 300*b* may drop the level of the output voltages VOUT1 and VOUT2 to a certain level of voltage, for example, the above-described threshold voltage, through the DVS loops 301*a* and 301*b*, and then may turn off the power transistor. In this case, according to some example embodiments, the power transistor may be provided separately from the DVS loops 301*a* and 301*b* in the one or more regulators 300*a* and 300*b* for the regulation. Due to the turn-off of the power transistors 302*a* and 302*b*, the output voltages VOUT1 and VOUT2 may drop to an off voltage, for example, 0 volts, from the threshold voltage.

In some example embodiments, in a case where the discharge times for the output voltages VOUT1 and VOUT2 of specific levels are different for each of the regulators 300*a* and 300*b* during the power-off regulation, a voltage reversal phenomenon may occur between the power rails during the power-off. According to the present inventive concepts, since the one or more regulators 300*a* and 300*b* drop the level of the output voltages VOUT1 and VOUT2 to the threshold voltage through the DVS loops 301*a* and 301*b* first and then may perform a remaining regulation through the off-operation of the power transistors 302*a* and 302*b*, the voltage reversal phenomenon may be prevented or reduced.

The processor 20 may control an overall operation of the system-on-chip 1. As an example, the processor 20 may be implemented by a general-purpose processor, a dedicated processor, or an application processor (AP). As an example, the processor 20 may be implemented by an operation processor (e.g., a central processing unit (CPU), a graphic processing unit (GPU), etc.) including a dedicated logic circuits (e.g., a field programmable gate array (FPGA), application specific integrated circuits (ASICs), etc.), however, it should not be limited thereto or thereby.

The processor 20 may run programs stored on the system-on-chip 1. According to an example embodiment, the processor 20 may process data stored on the system-on-chip 1 and data provided from the outside.

As an example, the processor 20 may transmit the power-off signal Poff and the dynamic control signal DCON to the PMIC 10*a* while being operated in the power-off sequence. The processor 20 may receive voltages required or used for the power-off sequence through the PMIC 10*a*.

According to some example embodiments, the regulator included in the system-on-chip 1 may drop the voltage to the threshold voltage through the DVS loops 301*a* and 301*b* first and then may perform the off-operation of the power transistors 302*a* and 302*b* during the power-off sequence. Accordingly, in some example embodiments, the regulator may reduce a time required or used for the power-off sequence, and thus, it is possible to precisely or substantially match the power-off sequence between components on which the power-off sequence is performed. In addition, the voltage reversal phenomenon may be prevented (or reduced or minimized) from occurring between the power rails during the power-off sequence.

Figure 2:
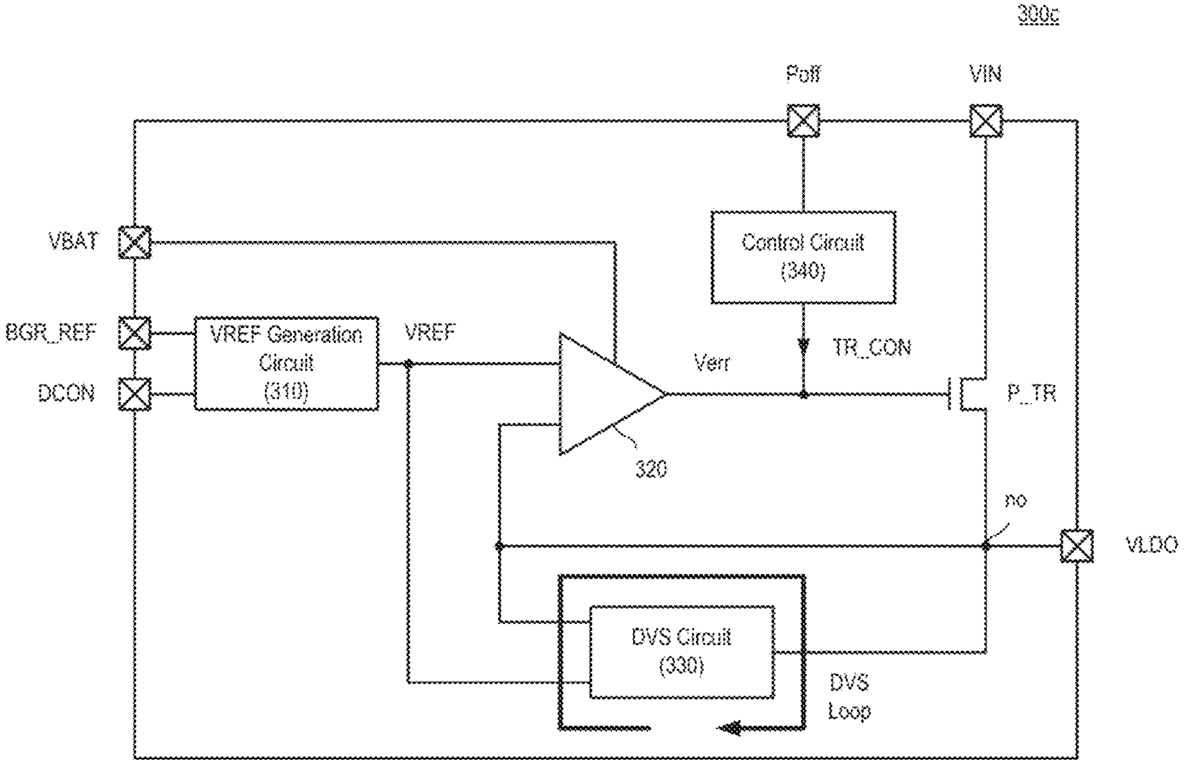
FIG. 2 is a circuit diagram illustrating a regulator according to an example embodiment.

FIG. 2 is a circuit diagram illustrating a regulator 300*c* according to an example embodiment.

Referring to FIG. 2, the regulator 300*c* may include a reference voltage generation circuit 310, an error amplifier 320, a power transistor P_TR, a DVS circuit 330, and a control circuit 340.

The reference voltage generation circuit 310 may generate a second reference voltage VREF varied from a first reference voltage according to the dynamic control signal DCON. As an example, the first reference voltage may be a BGR voltage BGR_REF generated by the BGR generator of FIG. 1. The dynamic control signal DCON may be provided from the processor of FIG. 1 and may be a control signal that dynamically varies the level of the first reference voltage and generates the second reference voltage VREF. As an example, the reference voltage generation circuit 310 may include a digital-to-analog converter (DAC) that converts the first reference voltage and the dynamic control signal DCON to an analog level corresponding to the second reference voltage VREF when the first reference voltage and the dynamic control signal DCON are a digital signal.

The error amplifier 320 may include input terminals respectively connected to an output terminal of the reference voltage generation circuit 310 and an output node no and thus may receive the second reference voltage VREF and a regulation voltage VLDO output from the output node no. An output terminal of the error amplifier 320 may be connected to a gate terminal of the power transistor P_TR and may output an error voltage Verr to the gate terminal of the power transistor P_TR based on comparing the second reference voltage VREF with the regulation voltage VLDO. The error amplifier 320 may be driven in response to a battery voltage VBAT.

The power transistor P_TR may include the gate terminal connected to the error amplifier 320, one terminal to which the input voltage VIN is applied, and the other terminal connected to the output node no. The power transistor P_TR may be turned on or off in response to a gate voltage controlled by the error voltage Verr. For example, when the power transistor P_TR is turned on, the input voltage VIN may be regulated, and the regulation voltage VLDO may be output to the output node no. According to an example embodiment, when the regulator 300*c* operates in the power-off sequence, the power transistor P_TR may be turned off after the DVS loop operates based on the DVS circuit 330.

According to various example embodiments, the power transistor P_TR may be implemented by an NMOS that is an N-type MOSFET (metal oxide semiconductor field effect transistor) or a PMOS that is a P-type MOSFET. As an example, when the power transistor P_TR is the NMOS, the input voltage VIN may be applied to a drain terminal of the power transistor P_TR, and a source terminal of the power transistor P_TR may be connected to the output node no.

The DVS circuit 330 may be connected to the reference voltage generation circuit 310 and the output node no. The DVS circuit 330 may be configured to receive the second reference voltage VREF and the regulation voltage VLDO and to drop the regulation voltage VLDO to the second reference voltage VREF. For example, the DVS circuit 330 may operate to allow the regulation voltage VLDO to correspond to a level of the second reference voltage VREF, which is controlled according to the dynamic control signal DCON.

According to an example embodiment, the second reference voltage VREF may be set to a certain threshold voltage when the power-off signal Poff is received, for example, when the power-off sequence starts. Accordingly, in some example embodiments, the DVS circuit 330 may drop the regulation voltage VLDO to the threshold voltage during the power-off sequence.

The DVS circuit 330 may operate from a start time point of a power-off period started in response to the power-off signal Poff to a certain time point. In some example embodiments, the certain time point may be defined as a point when the regulation voltage VLDO becomes the second reference voltage VREF. Since the second reference voltage VREF is set as the threshold voltage when the power-off signal Poff is received, the DVS circuit 330 may end its operation when the regulation voltage VLDO becomes the threshold voltage.

The DVS circuit 330 may operate at a higher discharge rate than a discharge rate after the certain time point in the power-off period. As an example, the DVS circuit 330 may have the certain slew rate, and the slew rate may be set so that the voltage drop caused by the DVS circuit 330 is performed faster than the discharge due to the turn-off of the power transistor.

The control circuit 340 may control an overall operation of the regulator 300*c*. When the power-off signal Poff is received from the processor, the control circuit 340 may operate to turn off the power transistor P_TR based on the voltage drop of the regulation voltage VLDO to the second reference voltage VREF by the DVS circuit 330. For example, when the power-off signal Poff is received, the second reference voltage VREF may be set as the threshold voltage. The control circuit 340 may detect whether the regulation voltage VLDO drops to the threshold voltage while monitoring the regulation voltage VLDO.

The control circuit 340 may provide a turn-off signal TR_CON to the gate terminal of the power transistor P_TR based on the threshold voltage that is sensed from the voltage from the regulator 300*c*. The power transistor P_TR may be turned off in response to the turn-off signal TR_CON. In some example embodiments, when the power transistor P_TR is turned off, the DVS loop, which is defined as the loop that drops the regulation voltage VLDO according to the DVS circuit 330 and the output node no, may also no longer work. Accordingly, in some example embodiments, the regulator 300*c* may continue the remaining discharge operation according to the turned-off power transistor P_TR until the power is turned off.

According to the above-described example embodiments, the regulator 300*c* may quickly lower the regulation voltage VLDO to the certain voltage, e.g., the threshold voltage, through the DVS circuit 330 during the power-off sequence. For example, the time required or used for the power-off sequence may be reduced, and it is possible to precisely or substantially match the power-off sequence between the components on which the power-off sequence is performed. In addition, in the regulator 300*c* to which the DVS circuit 330 is provided, the power-off sequence may be controlled only by the operation (operating the DVS circuit 330 during the power-off sequence and turning off the power transistor P_TR when the threshold voltage is detected) of the control circuit 340 without the addition of complex hardware elements.

Figure 3:
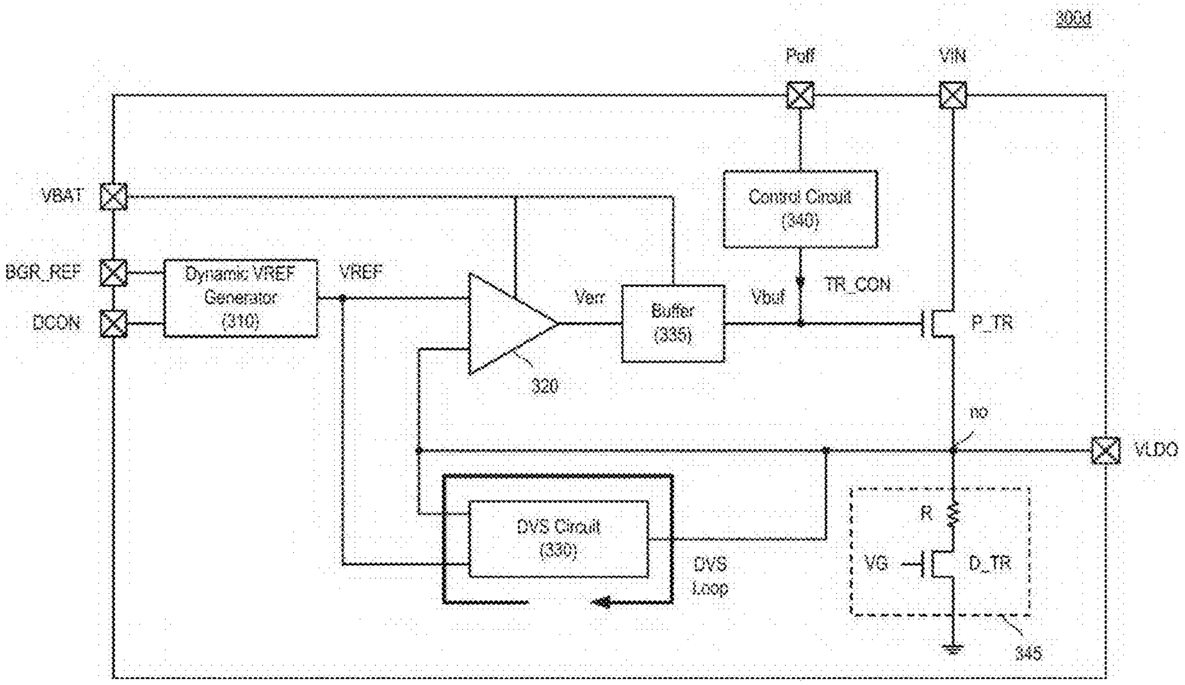
FIG. 3 is a circuit diagram illustrating a regulator according to an example embodiment.

FIG. 3 is a circuit diagram illustrating a regulator 300*d* according to an example embodiment. Hereinafter, in FIG.

3, the same reference numerals denote the same elements in FIG. 2, and thus, detailed descriptions of the same elements will be omitted.

Referring to FIG. 3, the regulator 300*d* may include a reference voltage generation circuit 310, an error amplifier 320, a power transistor P_TR, a DVS circuit 330, and a control circuit 340 and may further include a buffer 335 and a discharge circuit 345.

The buffer 335 may be connected between an output terminal of the error amplifier 320 and a gate terminal of the power transistor P_TR. The buffer 335 may buffer an error voltage Verr output based on the reference voltage generation circuit 310 and the error amplifier 320 and may output a buffer voltage Vbuf. The buffer 335 may have a high input impedance and a low output impedance, and thus, the buffer 335 may have load transient characteristics. As an example, the regulator 300*d* may include one or more buffers 335. The buffer voltage Vbuf may be applied to the gate terminal of the power transistor P_TR, and thus, the power transistor P_TR may perform the regulation in response to the buffer voltage Vbuf.

The discharge circuit 345 may be connected to an output node no and may be configured to quickly discharge a regulation voltage VLDO. According to an example embodiment, the discharge circuit 345 may include a resistor R and a transistor D_TR. The resistor R may be connected between the output node no and one terminal of the transistor. A gate voltage VG may be applied to a gate terminal of the transistor D_TR, and the other terminal of the transistor D_TR may be grounded. The transistor D_TR may discharge the regulation voltage VLDO of the output node no in response to the gate voltage VG. The discharge circuit 345 may operate continuously not only during non-power-off periods but also during the power-off period. For example, the discharge circuit 345 may operate even after the power transistor P_TR is turned off.

According to an example embodiment, the regulator 300*d* may drop the regulation voltage VLDO to the threshold voltage first through the power transistor P_TR, the discharge circuit 345, and the DVS circuit 330 during the power-off sequence. In some example embodiments, in the case where the threshold voltage is sensed from the regulation voltage VLDO, the control circuit 340 may turn off the power transistor P_TR. Accordingly, the DVS circuit 330 may be deactivated, and only the discharge circuit 345 operates. The regulator 300*d* may drop the regulation voltage VLDO to an off voltage using the discharge circuit 345.

According to the above-described example embodiments, as the regulator 300*d* may more quickly drop the regulation voltage VLDO to the threshold voltage using the DVS circuit 330 having a certain slew rate and then may turn off the power transistor P_TR, the remaining discharge operation may be performed using the discharge circuit 345. The discharge circuit 345 may be involved in both the drop to the threshold voltage and the drop after the threshold voltage, and thus, the power-off sequence may be performed more quickly.

Figure 4:
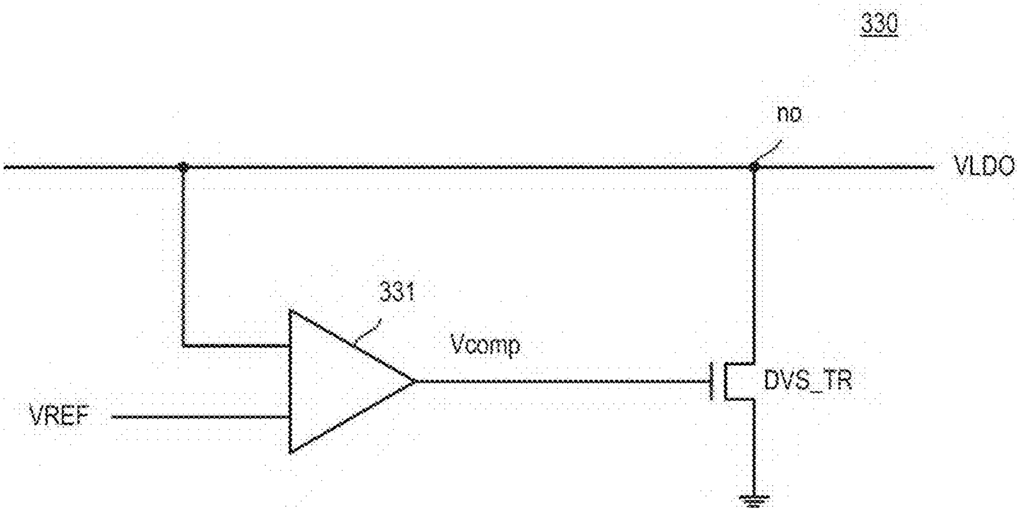
FIG. 4 is a circuit diagram illustrating a DVS circuit according to an example embodiment.

FIG. 4 is a circuit diagram illustrating the DVS circuit 330 according to an example embodiment.

Referring to FIG. 4, the DVS circuit 330 may include a DVS amplifier 331 and a DVS transistor DVS_TR.

The DVS amplifier 331 may include input terminals respectively connected to the reference voltage generation circuit 310 and the output node no of FIGS. 2 and 3, and the second reference voltage VREF and the regulation voltage VLDO may be respectively applied to the input terminals of the DVS amplifier 331. The DVS amplifier 331 may output a comparison voltage Vcomp based on the comparing of the second reference voltage VREF with the regulation voltage VLDO. An output terminal of the DVS amplifier 331 may be connected to a gate terminal of the DVS transistor DVS_TR, and the DVS amplifier 331 may output the comparison voltage Vcomp to the gate terminal.

One terminal of the DVS transistor DVS_TR may be connected to the output node no, the regulation voltage VLDO may be applied to the one terminal of the DVS transistor DVS_TR, and the other terminal of the DVS transistor DVS_TR may be grounded. The gate terminal of the DVS transistor DVS_TR may be connected to the DVS amplifier 331, and the DVS transistor DVS_TR may regulate the regulation voltage VLDO according to the comparison voltage Vcomp applied to the gate terminal.

The DVS amplifier 331 may compare the second reference voltage VREF, which is dynamically controlled, with the regulation voltage VLDO, and consequentially, the DVS amplifier 331 may drop the regulation voltage VLDO to the second reference voltage VREF. The DVS amplifier 331 may drop the regulation voltage VLDO to the threshold voltage during the power-off sequence according to the above-described embodiments, and then, the DVS amplifier 331 may be deactivated when the power transistor P_TR is turned off.

The DVS circuit 330 shown in FIG. 4 is merely an example, and the DVS circuit 330 may be configured in various ways to perform the regulation operation depending on the dynamically controlled reference voltage according to the above-described example embodiments.

Figure 5:
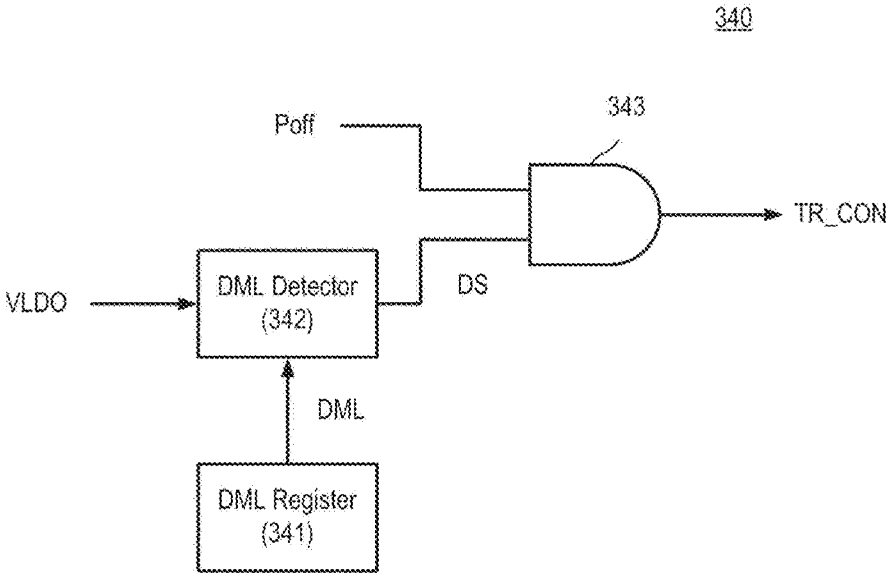
FIG. 5 is a circuit diagram illustrating a control circuit according to an example embodiment.

FIG. 5 is a circuit diagram illustrating the control circuit 340 according to an example embodiment.

Referring to FIG. 5, the control circuit 340 may include a DML (DVS min level) register 341, a DML sensor 342, and a logic element 343.

The DML register 341 may store a threshold voltage DML. As an example, the threshold voltage DML may be programmed on the DML register 341 from the processor of FIG. 1. The threshold voltage DML may be set in various ways according to the power-off sequence and may be stored.

The DML sensor 342 may sense the threshold voltage DML stored in the DML register 341 from the regulation voltage VLDO. For example, the DML sensor 342 may detect whether the regulation voltage VLDO drops to the threshold voltage DML while continuously monitoring the regulation voltage VLDO during the power-off sequence. In some example embodiments, when the threshold voltage DML is sensed, the DML sensor 342 may transmit a sensing signal DS to the logic element 343.

In some example embodiments, when both the power-off signal Poff and the sensing signal DS are identified, the logic element 343 may output the turn-off signal TR_CON. As an example, the logic element 343 may be implemented with an AND gate, however, the present inventive concepts should not be limited thereto or thereby. In some example embodiments, in the case where the logic element 343 is implemented with the AND gate, the logic element 343 may output the turn-off signal TR_CON through an AND operation when the power-off signal Poff corresponds to a logic representing that the power is off and the sensing signal DS corresponds to a logic representing that the threshold voltage DML is sensed.

Figure 6:
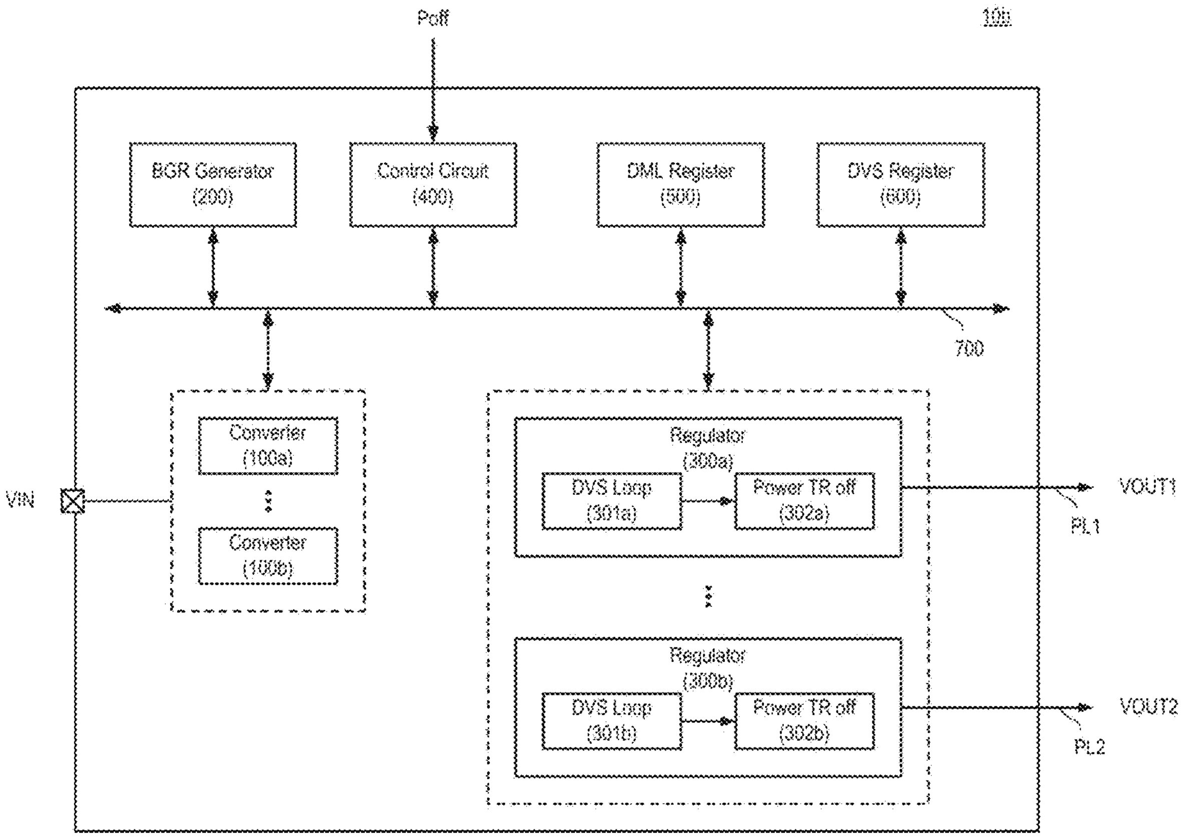
FIG. 6 is a block diagram illustrating a PMIC according to an example embodiment.

FIG. 6 is a block diagram illustrating a PMIC 10*b* according to an example embodiment.

Referring to FIG. 6, the PMIC 10*b* may include one or more converters 100*a* and 100*b*, one or more regulators

300*a* and 300*b*, a BGR generator 200, a control circuit 400, a DML register 500, and a DVS register 600, which are connected to each other via a bus 700.

The one or more converters 100*a* and 100*b* may covert an input voltage VIN to voltages required or used by the PMIC 10*b* and may output the converted voltages. The one or more regulators 300*a* and 300*b* may convert the voltages output from the one or more converters 100*a* and 100*b* based on a reference voltage generated by the BGR generator 200, e.g., a BGR voltage BGR_REF. In this case, the one or more regulators 300*a* and 300*b* may regulate output voltages VOUT1 and VOUT2 according to the above example embodiments so that the output voltages VOUT1 and VOUT2 may correspond to a second reference voltage, which is a dynamically controlled BGR voltage BGR_REF.

The control circuit 400 may control an overall operation of the PMIC 10*b*. According to an example embodiment, the control circuit 400 may receive a power-off signal Poff and may control an operation of the one or more regulators 300*a* and 300*b* in response to the power-off signal Poff. For example, the control circuit 400 may control the one or more regulators 300*a* and 300*b* to sequentially perform a driving operation of DVS loops 301*a* and 301*b* and an off-operation of power transistors 302*a* and 302*b* in response to the power-off signal Poff applied thereto.

First, the control circuit 400 may control the output voltages VOUT1 and VOUT2 through the DVS loops 301*a* and 301*b* included in the one or more regulators 300*a* and 300*b*. As an example, the control circuit 400 may drive the DVS loops 301*a* and 301*b* until the output voltages VOUT1 and VOUT2 drop to a threshold voltage after receiving the power-off signal Poff.

The control circuit 400 may read out the threshold voltage stored in the DML register 500, may drive the DVS loops 301*a* and 301*b*, and may sense the threshold voltage from the output voltages VOUT1 and VOUT2 during a power-off sequence. The control circuit 400 may program the read-out threshold voltage in the DVS register 600. The DVS register 600 may store a dynamic control signal DCON or the second reference voltage, which is a reference voltage of the DVS loops 301*a* and 301*b* indicated by the dynamic control signal DCON, and the control circuit 400 may set the read-out threshold voltage as the second reference voltage when receiving the power-off signal Poff. Accordingly, in some example embodiments, the DVS loops 301*a* and 301*b* may perform the regulation on the threshold voltage.

In some example embodiments, when the threshold voltage is sensed from the output voltages VOUT1 and VOUT2, the control circuit 400 may perform the off-operation of the power transistors 302*a* and 302*b* on the one or more regulators 300*a* and 300*b*. For example, the control circuit 400 may turn off one or more power transistors P_TR included in the one or more regulators 300*a* and 300*b*. Due to the off-operation of the power transistors 302*a* and 302*b*, the output voltages VOUT1 and VOUT2 may drop to an off voltage, for example, 0 volts, from the threshold voltage.

Consequently, in some example embodiments, the one or more regulators 300*a* and 300*b* may perform the regulation according to a first discharge rate in response to the control of the control circuit 400 until a regulation voltage VLDO drops to the reference voltage and may perform the regulation according to a second discharge rate lower than the first discharge rate after the regulation voltage VLDO drops to the reference voltage.

According to the above-described example embodiments, the PMIC 10*b* may control the one or more regulators 300*a* and 300*b* to sequentially drop the voltage to the threshold voltage through the DVS loops 301*a* and 301*b* and to perform the off-operation of the power transistors 302*a* and 302*b* through the control circuit 400 included in the PMIC 10*b* during the power-off sequence. Accordingly, in some example embodiments, the PMIC 10*b* may reduce the time required or used for the power-off sequence, and thus, it is possible to precisely or substantially match the power-off sequence between the components on which the power-off sequence is performed. In addition, the voltage reversal phenomenon may be prevented (or reduced or minimized) from occurring between power rails PL1 and PL2 during the power-off sequence.

Figure 7:
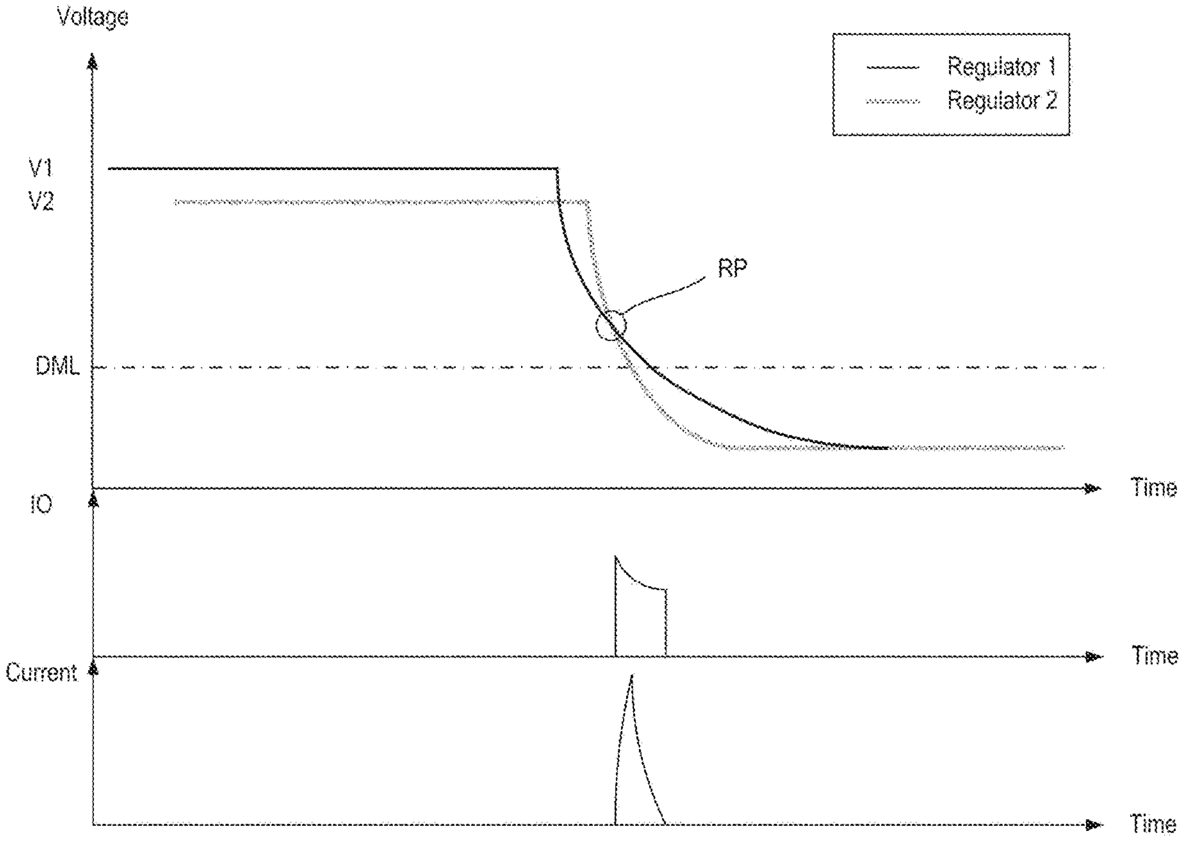
FIGS. 7 and 8 are waveform diagrams illustrating voltage waveforms of regulators according to some example embodiments.
Figure 8:
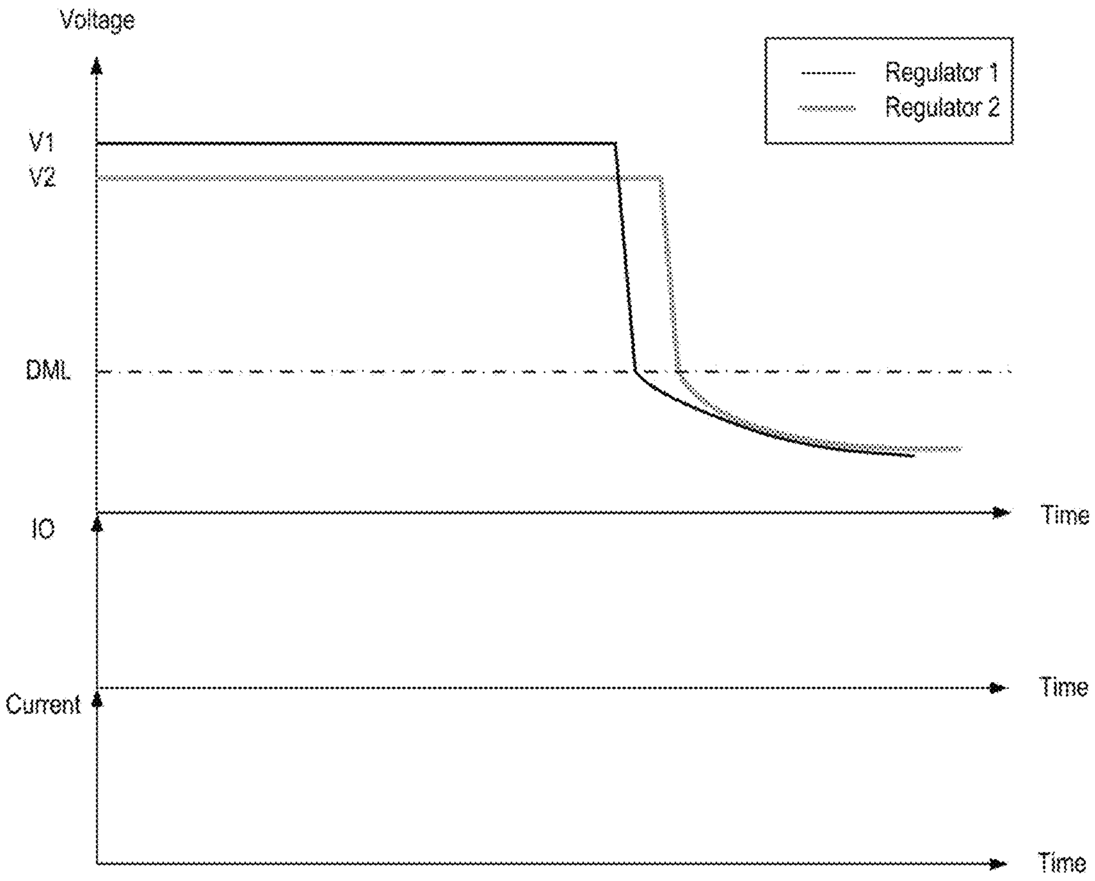

FIGS. 7 and 8 are waveform diagrams illustrating voltage waveforms of regulators according to some example embodiments.

FIG. 7 shows waveforms of a regulation voltage when the regulators immediately turn off a power transistor P_TR during a power-off sequence. As an example, the output voltages having different levels may be regulated by a first regulator and a second regulator, and an initial voltage V1 of the first regulator may be greater than an initial voltage V2 of the second regulator. In this case, when a discharge rate of the first regulator with respect to a threshold voltage DML is greater than a discharge rate of the second regulator with respect to the threshold voltage DML, a voltage reversal may occur at a reversal point RP as shown in FIG. 7. A voltage glitch and a leakage current may be generated in an input/output voltage IO due to the voltage reversal.

A method of delaying a start time point at which the power-off sequence of the second regulator starts may be considered in order to prevent or reduce the voltage reversal, however, the delay method only delays a discharge start time, so factors such as changes in external capacitors of the regulator or deviation between system-on-chips may not be taken into account.

FIG. 8 shows voltage waveforms of the regulation voltage when the regulation voltage drops to the threshold voltage DML by the DVS circuit 330 and then the power transistor P_TR is turned off during the power-off sequence. In this case, the power transistor P_TR may be turned on until the regulation voltage drops to the threshold voltage DML when the power-off sequence starts. Accordingly, in some example embodiments, the DVS circuit 330 may operate, and each of a first regulator and a second regulator may perform the regulation with a predetermined slew rate from the start time point of the power-off sequence until the regulation voltage drops to the threshold voltage DML.

Accordingly, in some example embodiments, the first regulator and the second regulator may perform the regulation with a rapid discharge rate to the threshold voltage DML through the DVS circuit 330 even though the discharge rate is changed at least after the power transistor P_TR is turned off. Preferably, the threshold voltage DML may be set to a voltage close to the off voltage, e.g., 0 volts, by taking into account the power-off sequence. Consequently, in some example embodiments, the first regulator and the second regulator may perform the power-off sequence without the voltage reversal, the glitch of the input/output voltage IO, and the leakage current even though the first regulator and the second regulator have different discharge rates even though the first regulator and the second regulator have different discharge rates from the threshold voltage DML to the off voltage.

Figure 9:
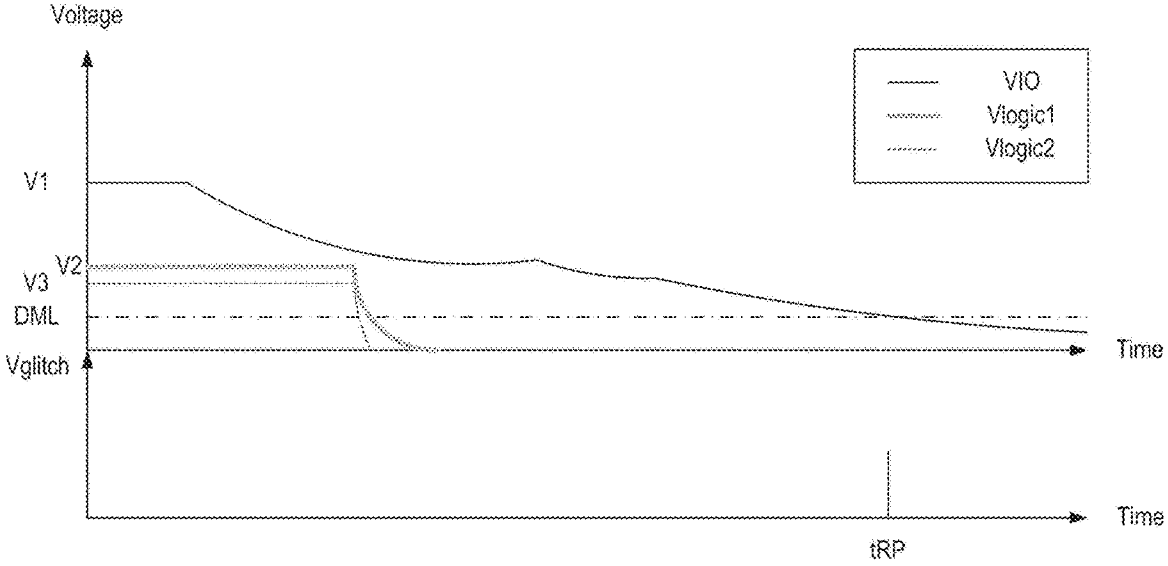
FIGS. 9 and 10 are waveform diagrams illustrating voltage waveforms of regulators according to some example embodiments.
Figure 10:
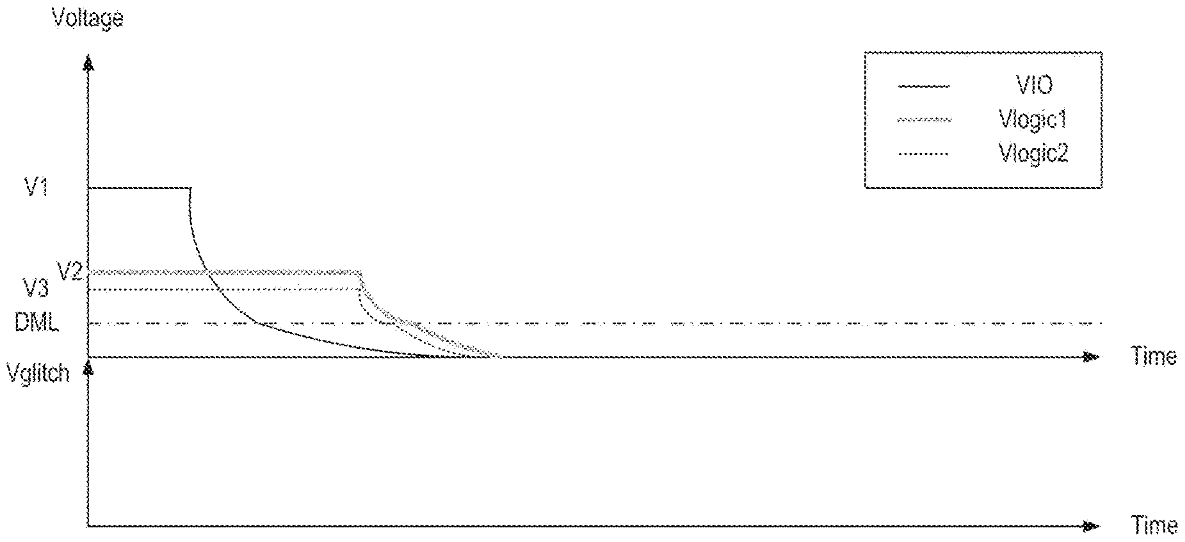

FIGS. 9 and 10 are waveform diagrams illustrating voltage waveforms of regulators according to some example embodiments.

FIG. 9 shows waveforms of a regulation voltage when the regulators immediately turn off the power transistor P_TR during the power-off sequence. During the power-off sequence, a voltage drop of an input/output voltage VIO of the PMIC may first begin at an initial voltage V1. Then, a first logic voltage Vlogic1 for the logic circuits included in the PMIC starts dropping at V2, and a second logic voltage Vlogic2 for the logic circuits included in the PMIC starts dropping at V3. Since a discharge rate of the input/output voltage VIO is the lowest overall, the first logic voltage Vlogic1 and the second logic voltage Vlogic2 already indicate an off voltage in a threshold voltage DML even though the input/output voltage VIO starts discharging first. Accordingly, in some example embodiments, it may be observed that a voltage glitch Vglitch is detected at a threshold voltage reach point tRP.

As described above, a method of delaying a start time point may be performed in order to prevent or reduce the voltage reversal, and as an example, enabling/disabling of a discharge circuit (for example, the discharge circuit 345 of FIG. 3), controlling of a discharge by changing a register setting of the discharge circuit, changing of a group in which the power-off sequence is performed, and changing of an off-start time point of the group may be performed.

FIG. 10 shows voltage waveforms of a regulation voltage when the regulation voltage drops to a threshold voltage DML by the DVS circuit 330 and then the power transistor P_TR is turned off during a power-off sequence. Each of voltages VIO, Vlogic1, and Vlogic2 may drop to the threshold voltage DML through the DVS circuit 330 when the power-off sequence starts, and after the drop of the voltages VIO, Vlogic1, and Vlogic2, the discharge according to an off-operation of the power transistor may be continued. Accordingly, in some example embodiments, a voltage reversal of each of the voltages VIO, Vlogic1, and Vlogic2 may be prevented or reduced, and a voltage glitch Vglitch may not be sensed.

Therefore, according to the present inventive concepts, the power-off sequence may be stably performed without performing various methods to prevent (or reduce or minimize) the voltage glitch of FIG. 9.

Figure 11:
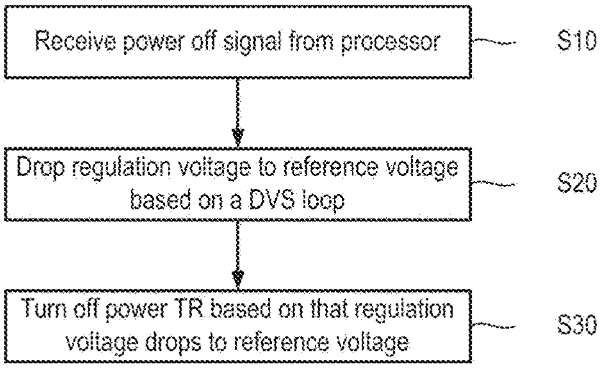
FIG. 11 is a flowchart illustrating an operation of a power management integrated circuit according to an example embodiment.

FIG. 11 is a flowchart illustrating a method of operating the power management integrated circuit according to an example embodiment.

Referring to FIG. 11, the power management integrated circuit may receive the power-off signal Poff from the processor (S10). The power management integrated circuit may start the power-off sequence in response to the power-off signal Poff.

The power management integrated circuit may drop the regulation voltage to the reference voltage based on the DVS loop included in the power management integrated circuit (S20). For example, the power management integrated circuit may drive the DVS loop first instead of immediately turning off the power transistor P_TR after receiving the power-off signal Poff through the operation S10.

According to the operation of the power management integrated circuit, the power transistor P_TR included in the power management integrated circuit may be turned off based on the voltage drop from the regulation voltage VLDO to the reference voltage (S30). The turning-off of the power transistor P_TR may further include sensing whether the regulation voltage VLDO corresponds to the reference voltage.

The method of operating the power management integrated circuit may further include setting the reference voltage as the threshold voltage in response to the received power-off signal Poff.

The method of operating the power management integrated circuit may further include performing the regulation according to the first discharge rate until the regulation voltage VLDO drops to the reference voltage and performing the regulation according to the second discharge rate lower than the first discharge rate after the regulation voltage VLDO drops to the reference voltage.

Figure 12:
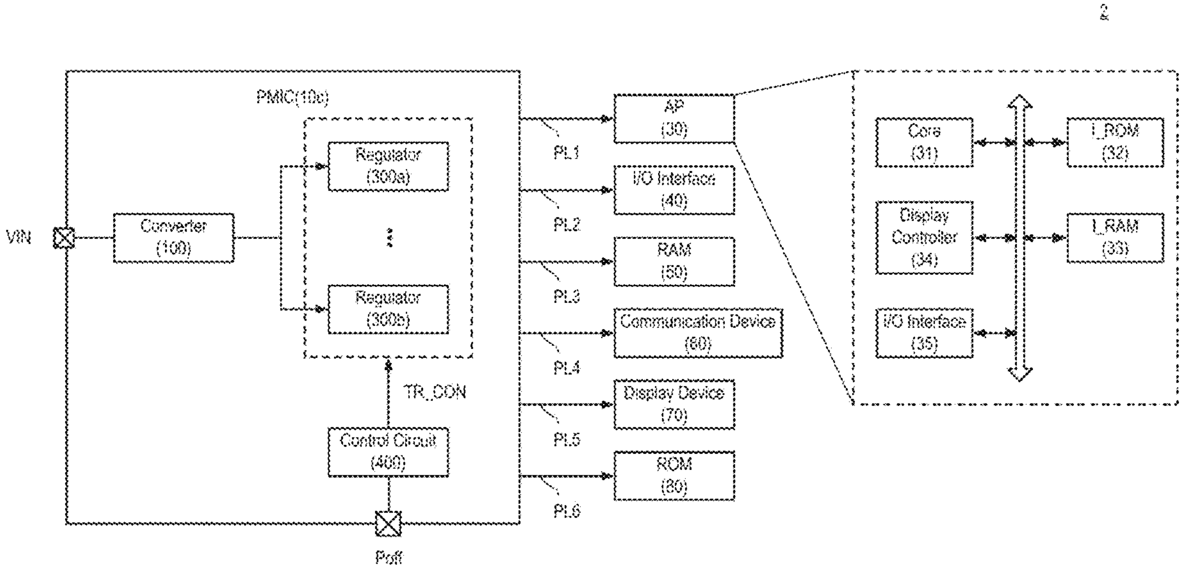
FIG. 12 is a block diagram illustrating an electronic device according to an example embodiment.

FIG. 12 is a block diagram illustrating an electronic device 2 according to an example embodiment.

Referring to FIG. 12, the electronic device 2 may be implemented by a handheld device such as a cellular telephone, a smart phone, a tablet personal computer (PC), a personal digital assistant (PDA), an enterprise digital assistant (EDA), a digital still camera, a digital video camera, a portable multimedia player (PMP), a personal navigation device (PND), a portable navigation device (PND), a handheld game console, an e-book, etc., but example embodiments are limited thereto.

The electronic device 2 may include a PMIC 10*c*, an application processor (AP) 30, an input/output interface 40, a random access memory (RAM) 50, a communication device 60, a display device 70, and a read only memory (ROM) 80.

The PMIC 10*c* may be implemented according to the above-described various example embodiments. The PMIC 10*c* may convert an input voltage VIN provided from a battery (not shown) included in the electronic device 2 into various levels of output voltage and may provide the output voltage to various load devices.

The PMIC 10*c* may monitor a workload and a system performance for each load device and may adjust a supply voltage and a clock frequency based on the monitored result. As an example, when the workload of the load device is light, the PMIC 10*c* may lower the supply voltage and the clock frequency and thus may reduce a power consumption. In a case where the workload of the load device increases, the PMIC 10*c* may increase the supply voltage and the clock frequency to maintain the performance.

The PMIC 10*c* may include a converter 100, one or more regulators 300*a* and 300*b*, and a control circuit 400. The PMIC 10*c* may convert the input voltage VIN to a lower or higher voltage through the converter 100 and may regulate the converted voltage to a voltage level required or used by the load device through the one or more regulators 300*a* and 300*b*. In some example embodiments, when the control circuit 400 receives a power-off signal Poff, the control circuit 400 may allow the one or more regulators 300*a* and 300*b* to drop a regulation voltage to a threshold voltage through a DVS loop first, and then, when the threshold voltage is sensed, the control circuit 400 may turn off a power transistor P_TR in response to a turn-off signal TR_CON to perform a power-off sequence.

The PMIC 10*c* may be connected to various load devices through a plurality of power rails PL1 to PL6 and may provide the output voltage converted by the one or more regulators 300*a* and 300*b*. In this case, the power-off sequence using the DVS loop may prevent or reduce a voltage reversal between the power rails PL1 to PL6.

The AP 30 may control an overall operation of the electronic device 2. As an example, the AP 30 may provide the power-off signal Poff to the PMIC 10*c* during the power-off sequence.

According to an example embodiment, the AP 30 may include a core 31, an internal ROM 32, an internal RAM 33, a display controller 34, and an input/output interface 35. The core 31 may process or execute programs and/or data stored in memories. For example, the core 31 may be implemented as a multi-core processor. A booting code may be stored in the internal ROM 32. The core 31 may temporarily store programs, data, or instructions in the internal RAM 33 according to the booting code stored in the internal ROM 32. The display controller 34 may be configured to control an operation of the display device 70. The input/output interface 35 may provide an interface with respect to an IP (intellectual property) connected to the AP 3*o*.

According to an example embodiment, the AP 30 may be a ModAP in which functions of a modem chip included in the communication device 60 are integrated.

The input/output interface 40 may provide an interface to transmit and receive data of the electronic device 2.

The RAM 50 may temporarily store programs, data, or instructions. As an example, the programs and/or data stored in a memory may be temporarily stored in the RAM 50 according to the control of the CPU or the booting code stored in the ROM 80. The RAM 50 may be implemented by a dynamic RAM (DRAM) or a static RAM (SRAM).

The communication device 60 may transmit and receive signals between the electronic device 2 and other external devices according to various communication protocols. The communication device 60 may include an antenna, a transceiver, and/or a modem (MODEM).

The display device 70 may display image signals output from a display controller. As an example, the display device 70 may be implemented as a liquid crystal display (LCD), a light emitting diode (LED) display, an organic LED (OLED) display, an active-matrix OLED (AMOLED) display, or a flexible display.

The ROM 80 may store permanent programs and/or data. The ROM 80 may be implemented by an erasable programmable read-only memory (EPROM) or an electrically erasable programmable read-only memory (EEPROM).

In addition, the PMIC 10*c* may be connected to an operation block, a function block, or an IP block that may be included in the electronic device 2 to provide various levels of voltage.

Figure 13:
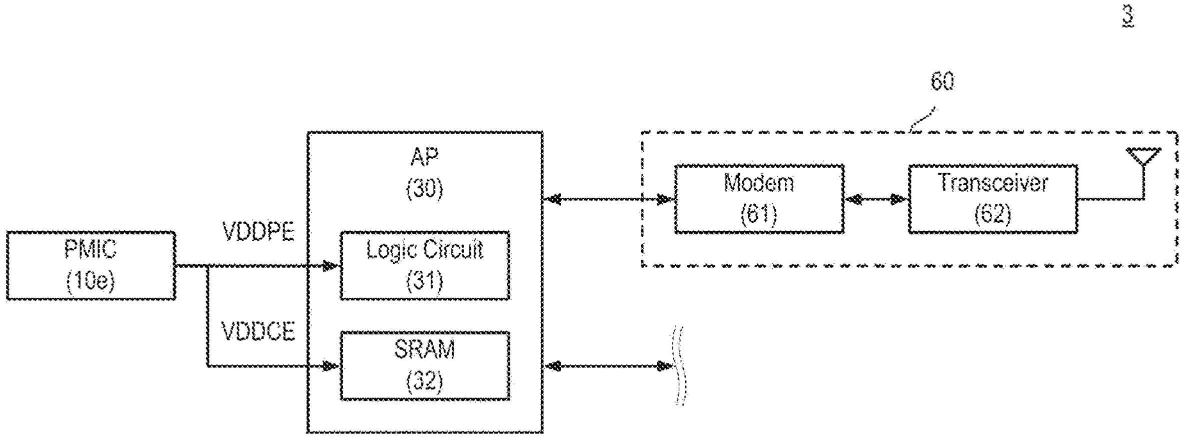
FIG. 13 is a block diagram illustrating an electronic device according to an example embodiment.

FIG. 13 is a block diagram illustrating an electronic device 3 according to an example embodiment.

Referring to FIG. 13, the electronic device 3 may include a PMIC 10*e*, an AP 30, and a communication device 60.

The PMIC 10*e* may regulate a reference voltage and may provide a first driving voltage VDDPE required or used by a logic circuit 31 and a second driving voltage VDDCE required or used by an SRAM 32. The PMIC 10*e* may include the regulator according to the above-described embodiments.

The AP 30 may include the logic circuit 31 and the SRAM 32. The logic circuit 31 may be configured to allow the AP 30 to process or execute various programs and/or data. The SRAM 32 may be used as a cache memory, a register, or a buffer memory in the electronic device 3. The AP 30 may be connected to the PMIC 10*e* and may receive the first driving voltage VDDPE and the second driving voltage VDDCE from the PMIC 10*e*. The logic circuit 31 may be operated based on the first driving voltage VDDPE, and the SRAM 32 may be operated based on the second driving voltage VDDCE.

The communication device 60 may include a modem 61 and a transceiver 62. The modem 61 may process a baseband signal containing information to be transmitted or may process a baseband signal received thereto. The transceiver 62 may transmit/receive a radio frequency (RF) signal of a specific band, which is converted from the baseband signal, to/from other electronic devices and may process the radio frequency (RF) signal of the specific band.

The communication device 60 may perform a discontinuous reception (DRX) to reduce power of the electronic device 3. According to the DRX, the electronic device 3 may maintain a power efficiency mode such as micro-sleep or off period within a DRX cycle. As an example, the communication device 60 may be switched to an idle state, e.g., an RRC_IDLE state, and/or an inactive state, e.g., an RRC_INACTIVE state, to reduce power consumption. In this case, the electronic device 3 switched to the idle and/or inactive state may be set to use a DRX method. As an example, the electronic device 3 switched to the idle and/or inactive state may be set to monitor a signal related to paging only in a specific sub-frame, frame, or slot according to the DRX cycle set by a base station or the like.

In some example embodiments, when the communication device 60 operates in a DRX state to reduce the power consumption, as a duration of the power-off sequence increases, it impacts both a latency and a current consumption of the electronic device 3. Accordingly, in some example embodiments, the duration of the power-off sequence may be optimized for a DRX operation.

Figure 14:
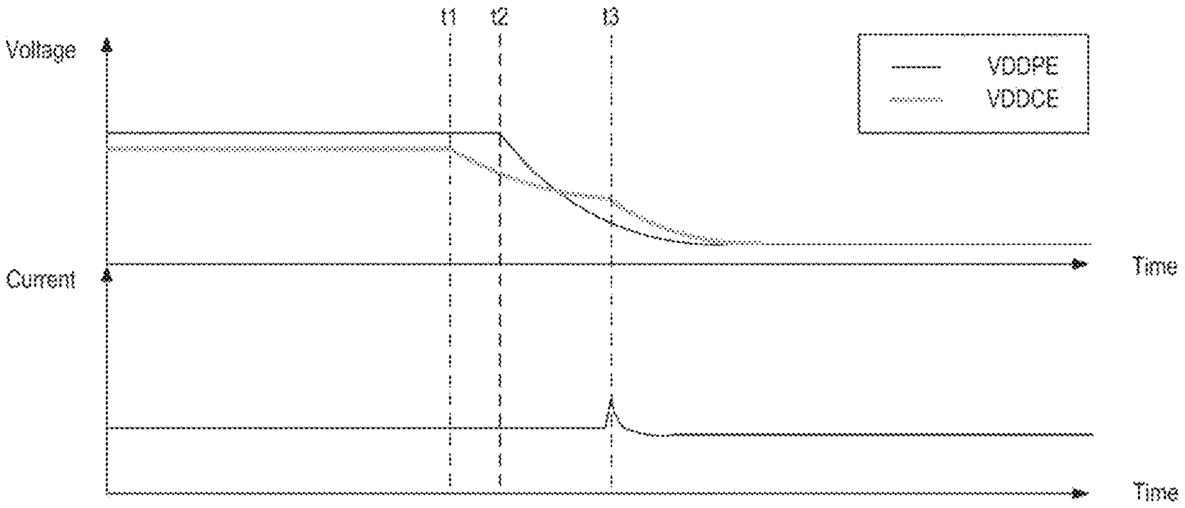
FIGS. 14 and 15 are waveform diagrams illustrating operation waveforms according to a regulation of the electronic device of FIG. 13.
Figure 15:
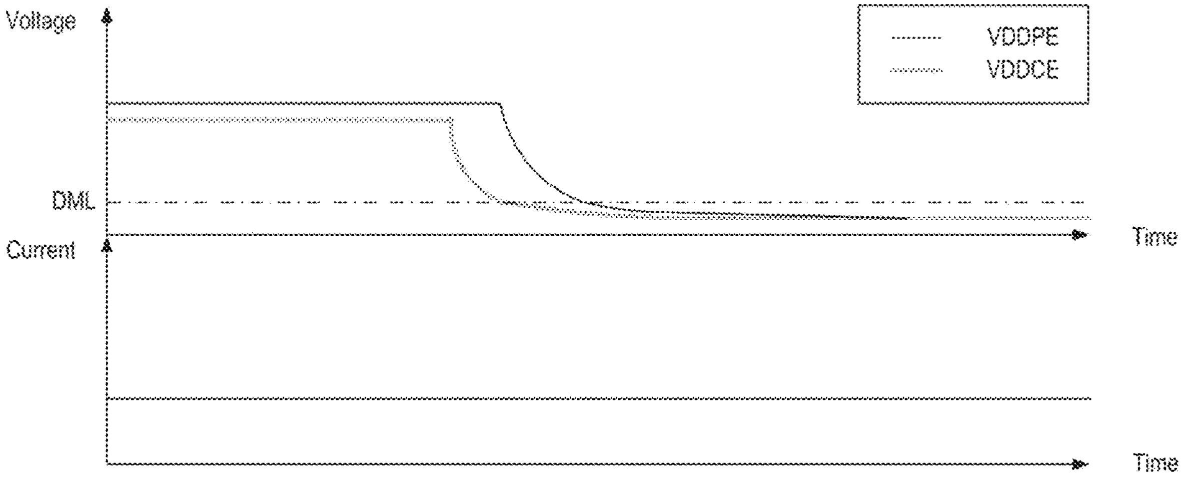

FIGS. 14 and 15 are waveform diagrams illustrating operation waveforms according to a regulation of the electronic device of FIG. 13.

FIG. 14 shows voltage waveforms of a regulation voltage VLDO when the regulators immediately turn off a power transistor P_TR during the power-off sequence according to the DRX operation. During the power-off sequence, the first driving voltage VDDPE has a level higher than that of the second driving voltage VDDCE, and this is because a leakage current (a time point t3) is generated when the first driving voltage VDDPE is reversed. Meanwhile, in a case where a duration of the power-off sequence decreases for the DRX operation, the voltage reversal is generated between the first driving voltage VDDPE and the second driving voltage VDDCE as shown in FIG. 14, and thus, the leakage current is generated. To prevent or reduce the leakage current, a time delay is between a start time point t1 of the power-off sequence related to the first driving voltage VDDPE and a start time point t2 of the power-off sequence related to the second driving voltage VDDCE.

FIG. 15 shows voltage waveforms of a regulation voltage VLDO when the regulation voltage drops to a threshold voltage DML by a DVS circuit 330 first and then a power transistor P_TR is turned off during the power-off sequence. In the case where the power transistor is turned off after the regulation voltage VLDO drops to the threshold voltage DML, the voltage reversal may be prevented or reduced without the time delay, which is a solution to prevent or reduce the leakage current in FIG. 14, and thus, the leakage current may not be generated.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Although the various example embodiments of the present inventive concepts have been described, it is understood that the present inventive concepts should not be limited to these various example embodiments but various changes and modifications can be made by one ordinary skilled in the art. Therefore, the present inventive concepts should not be limited to any single example embodiment described herein, and the scope of the present inventive concepts shall be determined according to the attached claims.

What is claimed is:

1. A regulator comprising:

a reference voltage generation circuit configured to generate a second reference voltage varied from a first reference voltage according to a dynamic control signal;

an error amplifier configured to generate an error voltage based on the second reference voltage and a regulation voltage at an output node;

a power transistor comprising a gate terminal connected to the error amplifier and configured to receive an input voltage to output the regulation voltage to the output node based on the error voltage;

a dynamic voltage scaling (DVS) circuit connected to the reference voltage generation circuit and the output node and configured to drop the regulation voltage to the second reference voltage; and a control circuit configured to receive a power-off signal from a processor and further configured to turn off the power transistor when the regulation voltage drops to the second reference voltage by the DVS circuit.

2. The regulator of claim 1, further comprising a discharge circuit connected to the output node and configured to discharge the regulation voltage.

3. The regulator of claim 2, wherein the DVS circuit is configured to operate from a start time point of a power-off period started according to the power-off signal to a certain time point, and the certain time point is defined as a point where the regulation voltage becomes the second reference voltage.

4. The regulator of claim 3, wherein the discharge circuit is configured to operate during the power-off period.

5. The regulator of claim 3, wherein the DVS circuit is configured to operate at a higher discharge rate in the power-off period than a discharge rate after the certain time point.

6. The regulator of claim 1, wherein the DVS circuit comprises:

a DVS amplifier configured to output a comparison voltage based on the comparing of the second reference voltage with the regulation voltage; and a DVS transistor comprising a gate terminal connected to the DVS amplifier and one terminal connected to the output node and configured to drop the regulation voltage to the second reference voltage based on the comparison voltage.

7. The regulator of claim 1, further comprising a buffer connected to the error amplifier and the gate terminal of the power transistor and configured to buffer the error voltage to output a buffer voltage.

8. The regulator of claim 1, wherein the second reference voltage is set as a threshold voltage when the power-off signal is received.

9. The regulator of claim 8, wherein the control circuit is configured to sense the threshold voltage from the regulation voltage after the power-off signal is received and is further configured to transmit a turn-off signal to the power transistor based on the sensed threshold voltage.

10. A power management integrated circuit comprising:

one or more regulators configured to regulate an input voltage and output a regulation voltage; and a control circuit configured to control the one or more regulators, wherein the control circuit is configured to operate a dynamic voltage scaling (DVS) loop that drops the regulation voltage to a reference voltage varying according to a dynamic control signal when a power-off signal is provided from a processor and turns off one or more power transistors included in the one or more regulators when the regulation voltage drops to the reference voltage.

11. The power management integrated circuit of claim 10, wherein the one or more regulators are configured to regulate the regulation voltage based on a first discharge rate until the regulation voltage drops to the reference voltage and are further configured to regulate the regulation voltage dropped to the reference voltage based on a second discharge rate lower than the first discharge rate after the regulation voltage drops to the reference voltage.

12. The power management integrated circuit of claim 10, wherein the control circuit is configured to set the reference voltage to a threshold voltage when the power-off signal is received.

13. The power management integrated circuit of claim 12, further comprising:

a first register configured to store the dynamic control signal; and a second register configured to store the threshold voltage.

14. The power management integrated circuit of claim 13, wherein the control circuit is configured to set the dynamic control signal stored in the first register to correspond to the threshold voltage stored in the second register when the power-off signal is received.

15. The power management integrated circuit of claim 10, wherein each of the regulators comprises:

a reference voltage generation circuit configured to generate the reference voltage in response to the dynamic control signal;

an error amplifier configured to generate an error voltage based on the reference voltage and the regulation voltage at an output node;

a power transistor comprising a gate terminal connected to the error amplifier and configured to receive an input voltage to output the regulation voltage to the output node based on the error voltage; and a dynamic voltage scaling (DVS) circuit connected to the reference voltage generation circuit and the output node and configured to drop the regulation voltage to the reference voltage.

16. The power management integrated circuit of claim 15, wherein the DVS loop is defined as a loop configured to drop the regulation voltage according to the DVS circuit and the output node.

17. A method of operating a power management integrated circuit, comprising:

receiving a power-off signal from a processor;

dropping a regulation voltage to a reference voltage using a dynamic voltage scaling (DVS) loop included in the power management integrated circuit; and turning off a power transistor included in the power management integrated circuit when the regulation voltage drops to the reference voltage such that the regulation voltage discharges to the reference voltage faster than the regulation voltage continues to discharge after the turning off of the power transistor.

18. The method of claim 17, further comprising sensing whether the regulation voltage corresponds to the reference voltage.

19. The method of claim 17, further comprising setting the reference voltage as a threshold voltage based on the received power-off signal.

20. The method of claim 17, further comprising:

regulating the regulation voltage based on a first discharge rate until the regulation voltage drops to the reference voltage; and regulating the regulation voltage dropped to the reference voltage based on a second discharge rate lower than the first discharge rate after the regulation voltage drops to the reference voltage.

* * * * *